United States Patent [19]
Armstrong

[11] 3,805,498
[45] Apr. 23, 1974

[54] ROTARY MOWER
[75] Inventor: William H. Armstrong, Bloomfield, Mich.
[73] Assignee: Montgomery Ward & Co., Chicago, Ill.
[22] Filed: Mar. 15, 1973
[21] Appl. No.: 341,101

[52] U.S. Cl.................... 56/17.5, 56/255, 56/320.2
[51] Int. Cl............................................ A01d 55/18
[58] Field of Search ....... 56/295, 320.1, 320.2, 255, 56/17.5, 13.4, 17.4

[56] References Cited
UNITED STATES PATENTS
| | | | |
|---|---|---|---|
| 2,807,126 | 9/1957 | Bennett | 56/13.4 |
| 3,601,960 | 8/1971 | Buechler | 56/320.2 |
| 3,680,295 | 8/1972 | Rutherford | 56/320.2 |
| 3,648,445 | 3/1972 | Efflandt | 56/320.2 |
| 3,706,189 | 12/1972 | Rutherford | 56/13.4 |

Primary Examiner—Russell R. Kinsey
Attorney, Agent, or Firm—Carpenter, Ostis & Lindberg

[57] ABSTRACT

A rotary mower has a rotating cutter blade housing with a discharge opening therefrom. The housing comprises upper and lower housing members secured in confronting relationship with the cutter blade therebetween. The lower housing member is in spaced relationship to the terrain and has an essentially circular shaped opening therein for exposure of the rotor blade in its cutting movement, the blade being protected along its tips by narrow flanges extending inward from the lower housing member. Extensions from the housing additionally protect the operator from the rotating rotor blade, and the housing has the discharge provided with a ramp for deflecting hard objects in an upward direction toward the upper housing member where it is deflected downward at the discharge opening.

1 Claim, 9 Drawing Figures

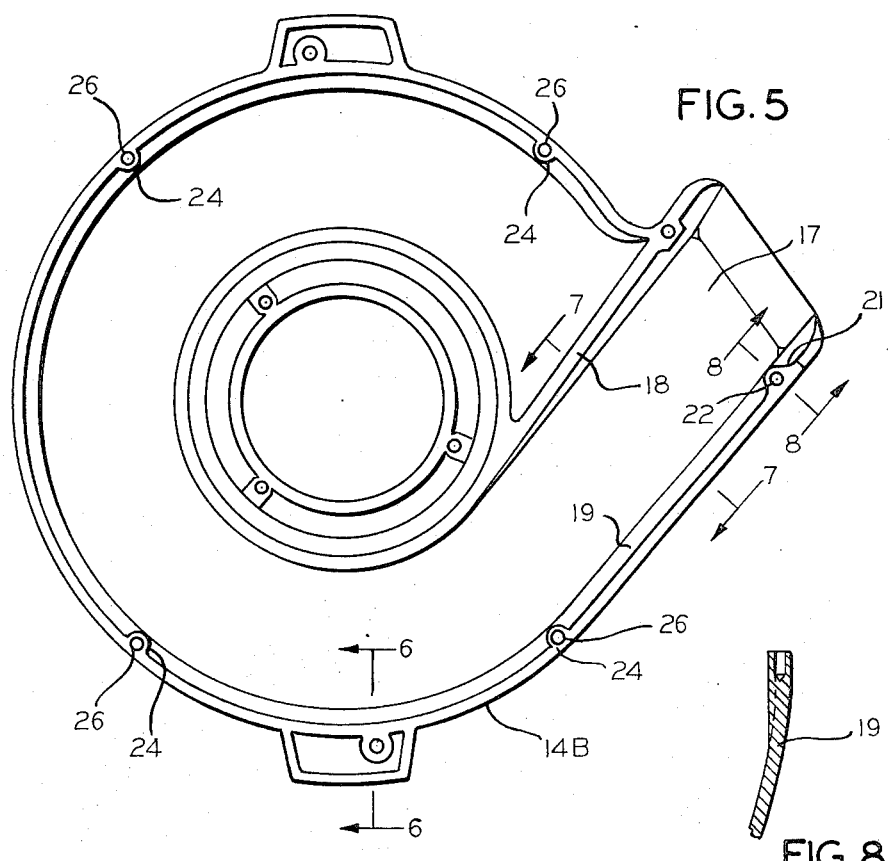
FIG. 5
FIG. 8
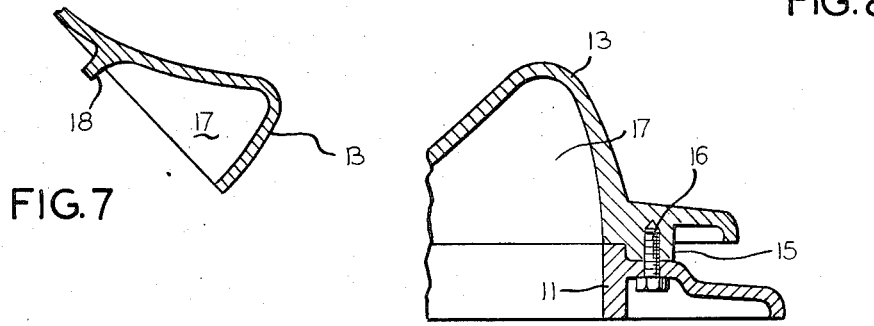
FIG. 7
FIG. 6

ROTARY MOWER

BACKGROUND OF THE INVENTION

1. Field of the Invention

The invention herein relates to a rotary type power lawn mower having structure for protecting the hands and feet of the operator from the rotating cutter blade thereof.

2. The Prior Art

The prior art discloses rotary mowers having safety guards for protecting the user from the rotating cutter blade. Schulz U.S. Pat. No. 3,541,771 is an example of a mower having the cutter blade enclosed or shrouded through part of its rotation. Thelander U.S. Pat. No. 2,802,327 also discloses a guard disposed at the discharge opening from the mower, and moreover discloses a front guard structure preventing the intrusion of the feet beneath the mower and into the path of the rotating blade. Ridenour et al. U.S. Pat. No. 2,972,849 discloses a front guard for protecting the feet of the user from the rotating cutter blade. Denney U.S. Pat. No. 3,002,331 shows a guard disposed below the plane for a like purpose.

The structure according to the present invention constitutes an improvement over the known prior art in that the ends of the rotor blade are substantially guarded at all times. Moreover, the present invention is also characterized by structure located at the discharge chute for discharging hard objects picked up by the rotor blade in a downward direction close to the mower frame.

SUMMARY OF THE INVENTION

The mower according to the present invention is characterized by a rotor blade housing consisting of two halves, one being an upper housing member supporting a prime mover, and the other being a lower housing member secured to the upper housing member at the peripheries thereof with the rotor blade therebetween. The structure is further characterized by the lower housing member having flanges enclosing the tips of the rotor blade. The invention is also characterized by structure in the discharge chute of the housing for diverting in a downward direction objects which have been picked up by the rotor blade.

THE DRAWINGS

FIG. 5 is a bottom plan view of an upper housing member, said view looking in the direction of the arrows 5—5 of FIG. 2;

FIG. 6 is a view taken along the line 6—6 of FIG. 5 looking in the direction of the arrows, and showing details of a volute discharge for cuttings resulting from the operation of the mower seen in the several views;

FIG. 7 is a vertical section spaced from the view of FIG. 6, showing details of the volute discharge, said view being taken along the line 7—7 of FIG. 5 looking in the direction of the arrows;

FIG. 8 is a vertical section taken along the line 8—8 of FIG. 5 looking in the direction of the arrows.

Figure 1:
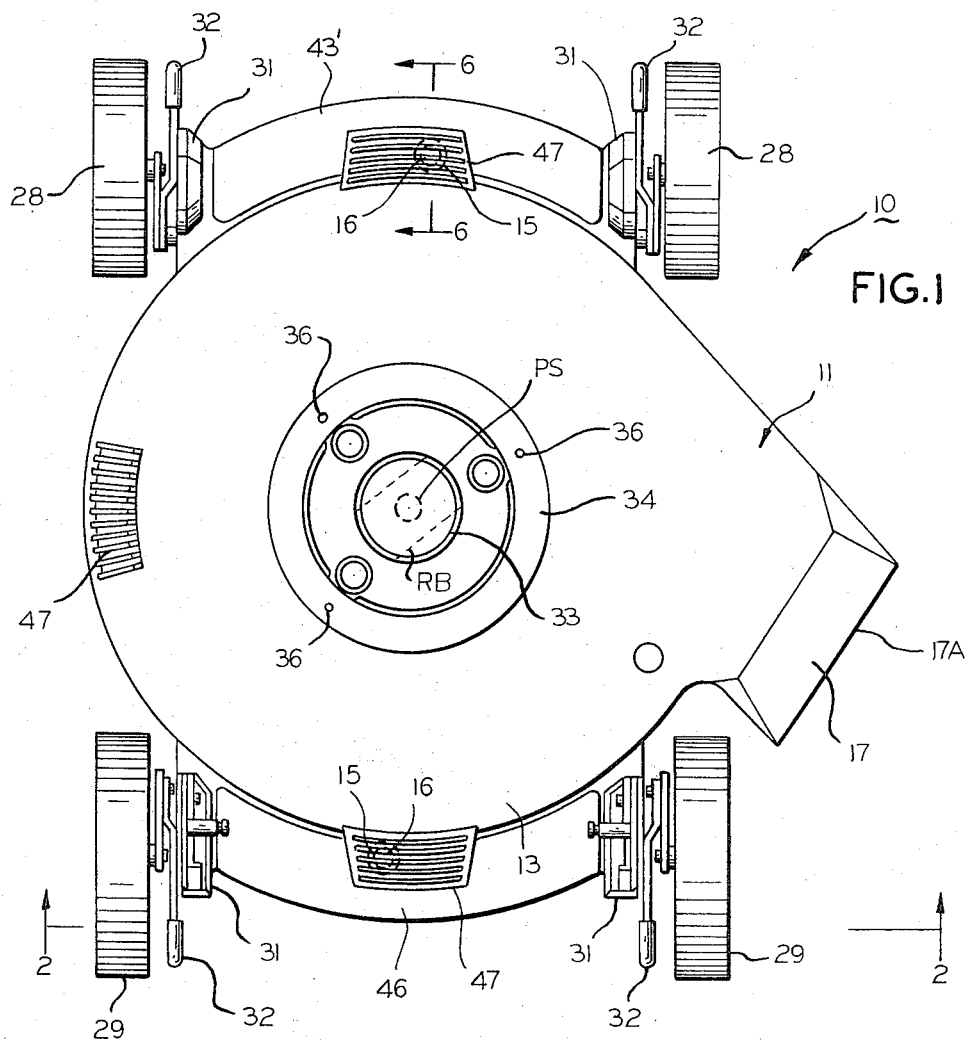
FIG. 1 is a plan view of a rotary mower having the improvements according to the present invention embodied therein.
Figure 2:
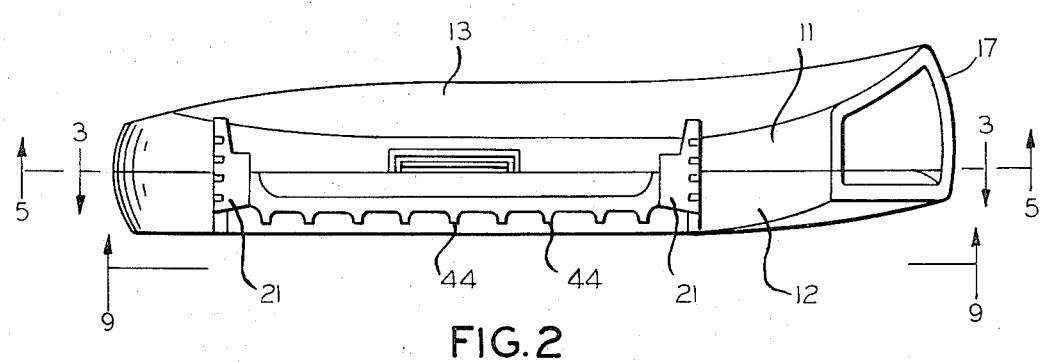
FIG. 2 is a rear elevation thereof looking in the direction of the arrows 2—2 of FIG. 1.

The improved rotary mower according to the present invention is denoted generally by the reference numeral 10 and is comprised of a mower housing 11 consisting of a lower housing member 12 and an upper housing member 13. The two housings are essentially circular in configuration, and the respective peripheral flanges 14A and 14B thereof provide areas where the two housing members meet in confronting relationship.

Structure is provided for fastening the housing members 12 and 13 together, and flange 14A of the lower housing member 12 is provided with a plurality of peripheral fastening lugs 15 extending laterally therefrom. Lugs 15 are secured in confronting relationship by fastening screws 16 as seen in FIG. 6 particularly.

Figure 3:
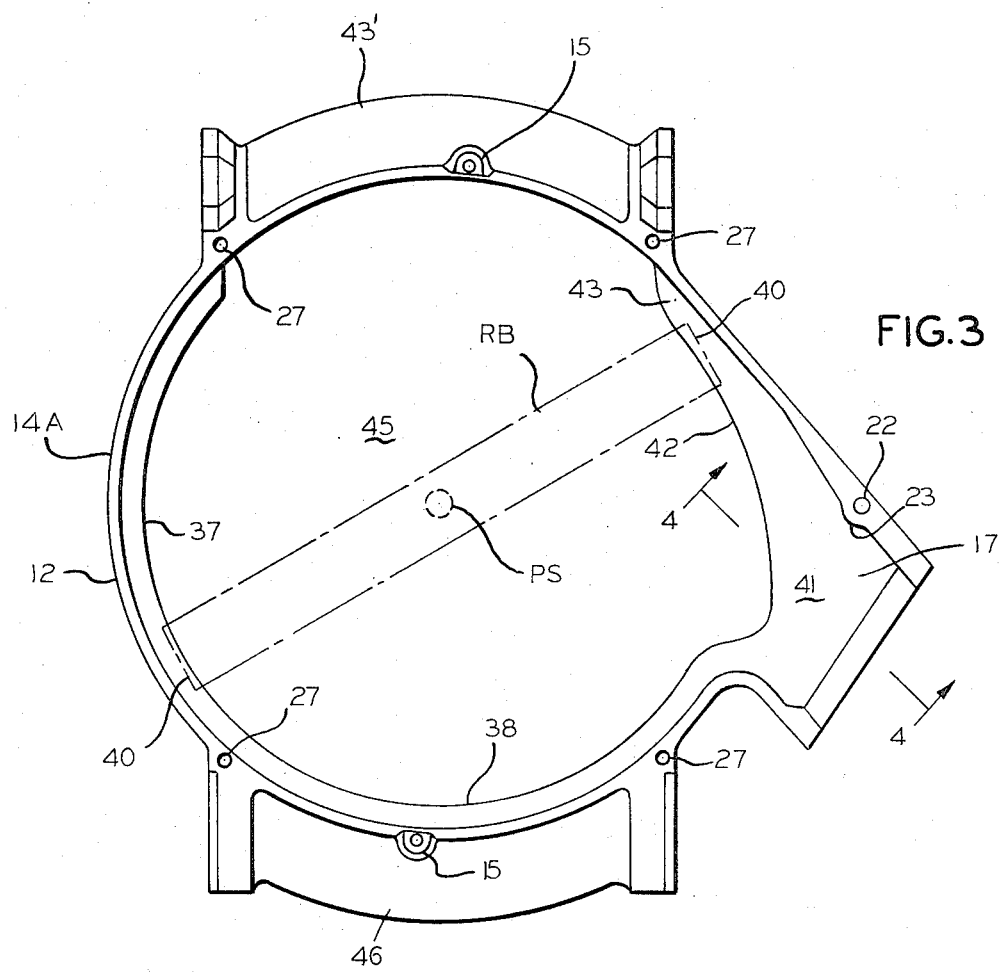
FIG. 3 is a plan view of a lower housing member forming part of the mower seen in FIG. 1, said view looking in the direction of the arrows 3—3 of FIG. 2.

The two housing members 12 and 13 form a volute-shaped discharge passageway 17 extending tangentially with respect thereto, discharge passageway 17 being also defined by a rib 18 in the upper housing 13 and a tangential extending rib 19. The latter is provided with a boss 21, see also FIG. 8, and a fastening element 22 extends through the boss 21 from the upper side of the housing member 11 and into a similar boss 23 in the lower housing member 12, see also FIG. 3.

The two housing members 12 and 13 are additionally maintained in proper alignment by lining bosses 24, each having a liner pin 26 extending therefrom, these being located in the upper housing member 13. Liner pins 26 cooperate with liner bores 27 arranged in the lower housing 12, see FIG. 3.

Structure is provided for enabling the mower assembly 10 to be moved over the terrain, and the lower housing 12, accordingly, has paired front and rear wheels 28 and 29, respectively. Each of the wheels is secured to a mounting structure 31 extending in fore and aft directions from the lower housing member 12. In order to vary the height of the mower 10 with respect to the terrain, each of the wheels 28 and 29 is provided with an adjusting structure indicated generally by the reference numeral 32. The precise details of such structure forms no part of the present invention and are well known in the art.

The two housing members 12 and 13 when so joined in confronting relationship along their peripheral flanges 14A and 14B provide an enclosure for a cutter blade RB rotating therebetween. Blade RB is powered from a prime mover, not shown, having a power shaft PS extending through an opening 33 in upper housing member 13. An annular stiffening flange 34 for housing member 13 is provided for mounting the prime mover, and spaced apertures 36 are provided in the annular stiffening flange 34 for securing the prime mover thereat.

Structure is provided in the lower housing member 12 for enclosing tips 40 of rotor blade RB through substantially all of its rotation to provide effective protection therefor and yet provide exposure of rotor blade RB for its cutting action. Lower housing member 12 is provided with an essentially circular shaped opening 45 and a narrow flange 37 extends inward from side portions of housing member 12 to one side thereof lying between front and rear wheels 28 and 29 along a corresponding side. A second narrow flange element 38 extends inward between the rear wheels 29.

Discharge passageway is partly defined by a lower web 41 formed integrally with lower housing member 12. Web 41 has marginal edges 42 defining minor flange portions 43 underlapping blade tips 40 and enclosing the same.

Structure is provided for shielding the tips 40 of the rotor blade RB through the remainder of its path of movement by means of a front guard 43' extending between the supports for front wheels 28, such front guard 43 having downward extending rake-like members 44 making it difficult for the feet of the operator to extend between the front wheels 28. Additionally, the dimension from the tip 40 of the rotor blade RB to the front guard 43 is such that it is not too easy to extend the front of a shoe or the like into the path of the rotating blade RB.

In like fashion, mower 10 has a rear guard 46 extending between the supports 31 for the rear wheels 29, and such rear guard 46 has the downward extending rake-like teeth 44.

In order to facilitate starting of the prime mover and to insure that the feet of the operator are out of a dangerous position with respect to the rotor blade RB, the upper housing 13 is provided with a plurality of treads 47 upon which the operator's foot may rest during the starting operation.

By reason of the configuration of the discharge volute 17, the cuttings are enabled to be moved in a path having an increased volume incident to the volumetric action caused by the rotor blade RB, thereby enhancing the movement of the cuttings.

Figure 4:
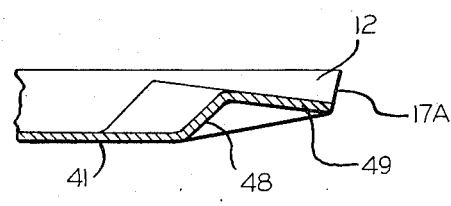
FIG. 4 is a vertical sectional view taken along the line 4—4 of FIG. 3 looking in the direction of the arrows.
Figure 9:
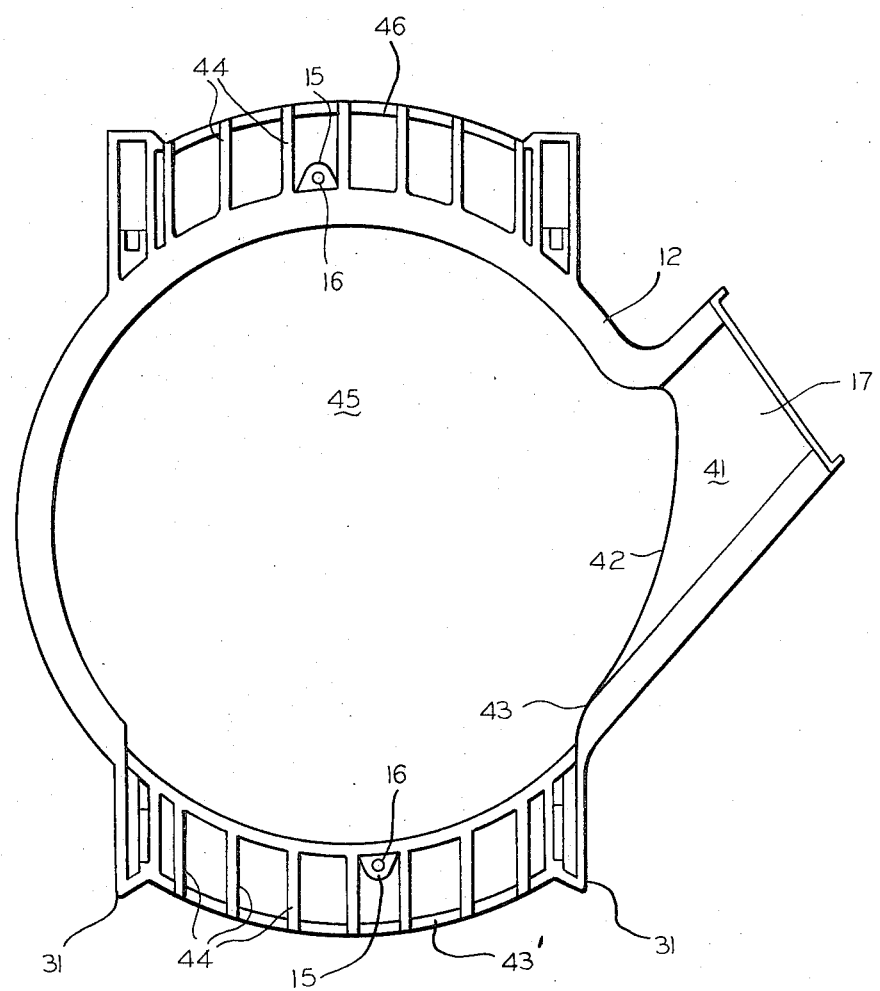
FIG. 9 is a bottom plan view of the lower housing member.

The rotor blade RB has a tendency to pick up hard objects such as stones or the like from the terrain, and when such occurs, they are diverted downward at a discharge opening 17A. Accordingly, web 41, see FIG. 4, fairs into a ramp 48 located adjacent the discharge opening 17A of the volute 17, the ramp 48 fairing down as at 49. The slope of the ramp 48 is such as to divert hard objects to the top of volute 17, causing the objects to be deflected therefrom and downward at the discharge opening 17A and closely adjacent the mower 10.

I claim:

1. In a rotary mower having a rotor blade housing and a discharge opening therefrom, a prime mover mounted on said housing including a rotor blade rotatable within said housing for delivery of cuttings to said discharge opening, the improvement wherein said housing comprises:
  a. upper and lower housing members secured in confronting relationship with said rotor blade rotatable therebetween;
  b. one of said housing members having front and rear frame extensions therefrom for paired front and rear ground engaging wheels secured to said frame extensions for movement of said housing over the terrain;
  c. a generally circular shaped opening in said lower housing member to provide exposure of said rotor blade for cutting action thereby in its rotative movement:
    i. said opening in said lower housing member being defined by a narrow flange extending inward from side portions of said housing between front and rear wheels along one side of said housing and underlapping the tips of said blade rotor;
    ii. said opening being additionally defined by a narrow flange extending inward from rear portions of said housing between the rear pair of ground wheels thereof;
  d. a web in said lower housing member spaced below the plane of said rotor blade and defining lower extremities of said discharge opening and partly enclosing the tips of said blade in its rotative movement and,
  e. a deflecting structure disposed on said lower housing and presenting an inclined surface in said passageway for diverting upward hard objects picked up by said rotor blade against the upper housing in the upper portions of said passageway whereby said objects will ricochet downward and be discharged in a downward direction at at said discharge opening.

* * * * *